July 19, 1966   P. W. CLARKE ETAL   3,262,046
REGULATED RECTIFIER SYSTEM
Filed June 28, 1962
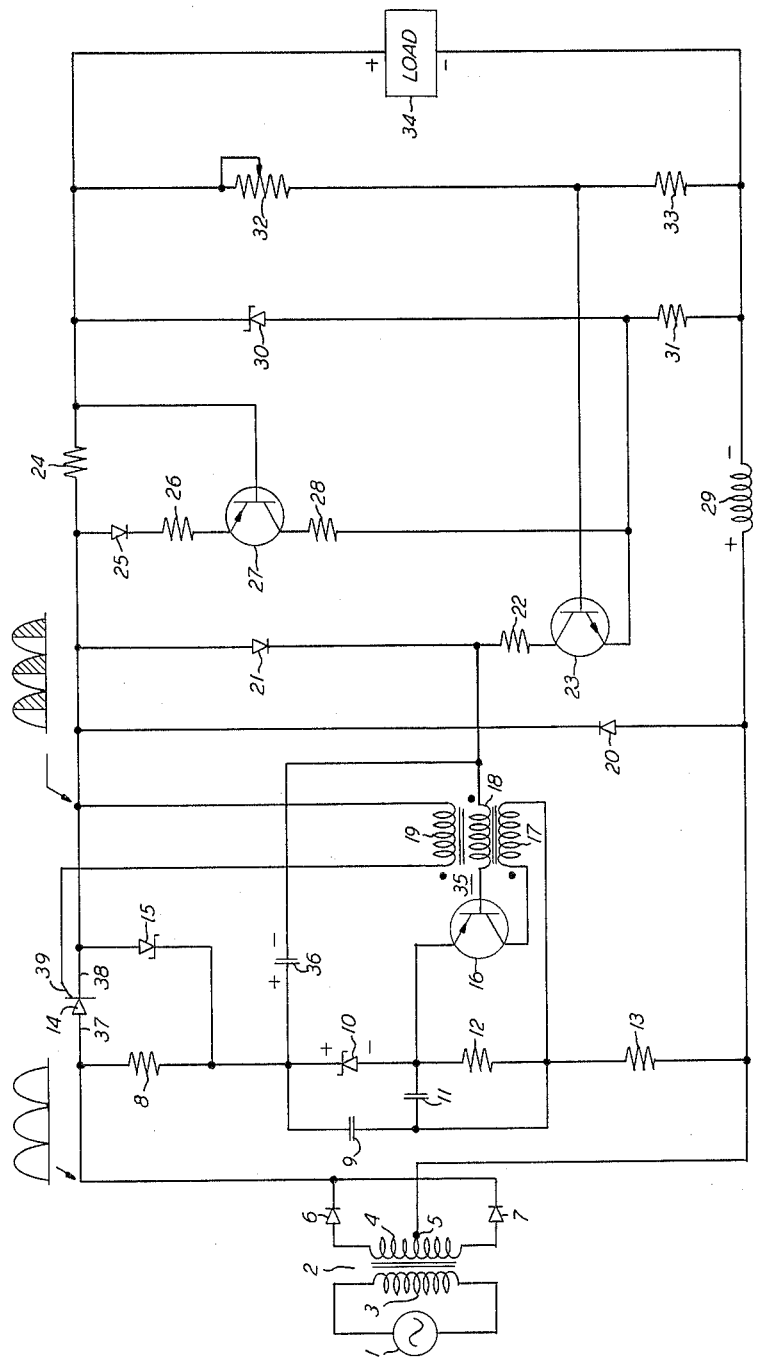
INVENTORS P.W. CLARKE
J. A. HENZ
J. K. MILLS
BY R. B. Ardis
ATTORNEY

United States Patent Office 3,262,046
Patented July 19, 1966

3,262,046
REGULATED RECTIFIER SYSTEM
Patrick W. Clarke, Jackson Heights, N.Y., and Jack A. Henz, Metuchen, and John K. Mills, Morristown, N.J., assignors to Bell Telephone Laboratories, Incorporated, New York, N.Y., a corporation of New York
Filed June 28, 1962, Ser. No. 206,069
6 Claims. (Cl. 321—18)

This invention relates to rectifier circuits and more particularly to rectifier circuits wherein voltage regulation is employed.

Rectifiers employing voltage and current regulation are numerous in the prior art. Usually an output voltage controlled impedance element operated in the active region (i.e., between the cut-off and saturation regions without going into either) is serially connected between the source of potential and the load. The impedance of, and hence the voltage drop across, the impedance element varies in accordance with load voltage variations to maintain a constant voltage across the load. The impedance element may be thought of as a variable resistor which absorbs the difference between the source and load potentials. Accordingly, this regulating element dissipates large amounts of power and requires means to remove the heat inherently generated. The efficiencies of such regulator rectifiers are, therefore, limited even under optimum conditions.

The prior art has also taught regulator-rectifiers wherein thyratrons were switched in accordance with a feedback load voltage error signal to obtain voltage regulation. Such circuits necessitated elaborate, and hence expensive and relatively unreliable, control circuits to control the "firing" of the regulating thyratron tube in accordance with load voltage variations. These prior art circuits also found difficulty in terminating the conduction of the regulating thyratron tube once it was "fired". Since regulation was achieved by controlling the relative conductive and non-conductive periods of the regulating thyratron tube, the quality and efficiency of regulation was greatly impaired. As noted, this was due mainly to the relatively low speeds at which the thyratrons could be switched due to the problems incurred in initiating and terminating the conduction intervals.

One object of this invention is, therefore, to increase the efficiency with which rectifier voltages and current may be regulated.

A closely related object is to do so as simply, reliably, and inexpensively as possible without restricting the applicability of the regulator.

The present invention employs a silicon controlled rectifier in series with a source of rectified alternating current, a filter inductor, and a load. The switching frequency of the silicon controlled rectifier is controlled by a switching transistor blocking oscillator which is, inturn, controlled by relaxing a periodic step function on a capacitive network which includes a load voltage error detecting current sink. The step function appears across the control capacitor in the capacitive network as a ramp function, the slope of which is inversely dependent upon the load voltage error signal which, in combination with the pulsating input signal variations, controls the "firing" of the controlled rectifier to achieve voltage regulation. The capacitor is quickly discharged through the controlled rectifier once the latter has "fired" and is thus prepared for the next cycle. The silicon controlled rectifier is, in turn, quickly extinguished by the action of the filter inductor in combination with a flyback diode at the end of each pulsation of input voltage. The controlled rectifier is thus in the blocking condition at the beginning of the subsequent pulsation of input voltage. The inherent high speed capability and simplicity of the "firing" circuit in combination with the quick "turn-off" feature provides high speed switching capability which, in turn, results in efficient as well as precision regulation.

The nature of the invention and its distinguishing features and advantages will be more clearly understood from the detailed description and the accompanying drawing, the single sheet of which is a schematic view of an embodiment of the invention.

As can be seen from the drawing, there is provided a source of alternating current 1, a transformer 2 with windings 3 and 4, the latter of which has a center tap 5, a full wave rectifier comprising diodes 6 and 7, a silicon controlled rectifier 14 having an anode electrode 37, a cathode electrode 38 and a gate electrode 39, a load 34, transistors 16, 23, and 27, Zener diodes 10, 15 and 30, diodes 20, 21 and 25, a pulse transformer 35 with windings 17, 18 and 19, capacitors 9, 11 and 36, a potentiometer 32, resistors 8, 12, 13, 22, 24, 26, 28, 31 and 33, and a filter inductor 29.

The source of alternating current 1 is connected to the primary winding 3 of transformer 2. Diodes 6 and 7 are connected to opposite ends of transformer winding 4 and, in combination with center tap 5, provide a full wave rectified pulsating D.C. input supply. The anode electrode 37 of the controlled rectifier 14 is connected to the positive terminal of full wave rectifier diodes 6 and 7 while the cathode electrode 38 is connected to the load 34. The other terminal of the load 34 is connected by the filter inductor 29 to the center tap negative terminal 5 of the full wave rectifier. Resistor 8, Zener diode 10, resistors 12 and 13 are serially connected across the rectified input source. Zener diode 15 and resistor 8 are serially connected across the controlled rectifier 14. Capacitor 9 is serially connected across Zener diode 10 and resistor 12. Capacitor 11 is connected across resistor 12. The emitter electrode of transistor 16 is connected to the juncture of Zener diode 10 and resistor 12, while the collector electrode of transistor 16 is connected to the juncture of resistors 12 and 13 by winding 17 of transformer 35. The base electrodes of transistor 16 is connected to the juncture of resistor 8 and Zener diode 10 by the series combination of winding 18 of transformer 35 and capacitor 36. Winding 19 of transformer 35 is connected across the gate 39 and cathode 38 electrodes of silicon controlled rectifier 14. Diode 20 is connected from the negative terminal of the rectified input source to the cathode electrode 38 of silicon controlled rectifier 14. Diode 21, resistor 22, the collector-emitter electrodes of transistor 23, and resistor 31 are serially connected from the cathode electrode 38 of silicon controlled rectifier 14 to the negative terminal of the load 34. Resistor 24 is serially connected between the cathode electrode 38 of silicon controlled rectifier 14 and the positive terminal of the load 34. The juncture of diode 21 and resistor 22 is connected to the juncture of winding 18 of transformer 35 and capacitor 36. Diode 25, resistor 26, and the emitter-base electrodes of transistor 27 are serially connected across resistor 24. Resistor 28 connects the collector electrode of transistor 27 to the emitter electrode of transistor 23. Reference Zener diode 30 and resistor 31 are serially connected across the load 34. Potentiometer 32 and resistor 33 are also serially connected across the load 34. The base electrode of transistor 23 is connected to the juncture of potentiometer 32 and resistor 33.

Since the dot convention will be referred to frequently in the following discussion, it will be defined at this time. Briefly, the dot convention refers to a means whereby the polarity of the voltage induced in a winding can be ascertained at any instant in the cycle of operation. For purposes of this discussion whenever a dot appears in relation to a winding, the polarity of the voltage induced at the dot in that winding is of the same polarity as the voltage induced at the dot of every winding in the same magnetic field.

The operation of the circuit is as follows: If the voltage across the load 34 should decrease, the change in voltage would also appear across the two load shunt paths, the first of which comprises potentiometer 32 and resistor 33 while the second comprises Zener diode 30 and resistor 31. In the first shunt path the portion of the load voltage change appearing across resistor 33 will depend on the resistance values of potentiometer 32 and resistor 33. In the second shunt path the breakdown voltage drop across Zener diode 30 will remain relatively constant and all the load voltage change will appear across the resistor 31. Since the voltage appearing across the base-emitter junction of transistor 23 will be the sum of the potentials appearing across resistors 31 and 33, this voltage will be proportional to the magnitude of the load voltage change and in the case of a decrease of load voltage is such as to bias transistor 23 further into conduction. Increased current flow through the collector-emitter path of transistor 23 results in more current flow through the charging path of capacitor 36, which comprises resistors 8, 22, and 31 in addition to the collector-emitter path of transistor 23. Capacitor 36 tends to charge to the magnitude of the "step" function which appears across the combination of resistor 8 and Zener diode 15. As time goes on, the potential to which capacitor 36 charges exceeds the potential appearing across Zener diode 10 which, as can be seen from the polarities indicated on the drawing, biases the base-emitter path of transistor 16 into conduction. Biasing the base-emitter path of transistor 16 into conduction in turn causes current to flow in the emitter-collector path of transistor 16 which also comprises resistor 12 and winding 17 of transformer 35. The current flow in winding 17 induces potentials in windings 18 and 19. As can be seen from the dot convention, including a potential in winding 18 will bias transistor 16 further into conduction which will, in turn, result in more emitter-collector current flow in transistor 16 and hence more induced potential in winding 18. This cycle would continue in such regenerative manner were it not for the premature termination, i.e., prior to saturation of transistor 16, caused by other circuit elements as discussed hereinafter.

The potential induced in winding 19 "fires" the silicon controlled rectifier 14 such that current will flow from the secondary winding 4 of transformer 2 through either diode 6 or 7, through silicon controlled rectifier 14, through resistor 24, through load 34, through the inductance 29, and back to the center tap 5 of secondary winding 4. It should be noted that the point at which the silicon controlled rectifier 14 fires is determined by the incoming signal as well as the "firing" signal of winding 19. The input alternating-current half wave must be in the positive volt-second region when the firing pulse is applied to enable the controlled rectifier 14 to "fire."

As the incremental alternating-current input signal volt-second area decreases, the potential at the cathode 38 of controlled rectifier 14 decreases as does the current flow in series circuit comprising the secondary winding 4, the diodes 6 or 7, the controlled rectifier 14, the load 34, and the filter inductor 29. The inductor 29, however, inherently opposes any change of current and attempts to sustain the current flow in the same direction. The induced potential in inductor 29 biases diode 20 into conduction and establishes a current path for the stored energy in inductor 29 through the load 34. Since the forward voltage drop across diode 20 is negligible, the cathode 38 of controlled rectifier 14 is essentially at the induced potential of the source terminal of inductor 29. The polarity of the induced potential in inductor 29 is as indicated on the drawing and acts to back-bias the controlled rectifier 14 and stops conduction therethrough. The conduction interval of controlled rectifier 14 is thus quickly and efficiently terminated.

Premature termination of the regenerative action of the combination of transistor 16 and transformer 35 is achieved in the following manner: Once the silicon controlled rectifier 14 "fires," diode 21 is biased into conduction and "clamps" the base of transistor 16 to the cathode 38 of controlled rectifier 14 which, in turn, biases transistor 16 into the nonconductive condition. Diode 21 also provides a discharge path for capacitor 36 through the series path comprising resistor 8, controlled rectifier 14 and the diode 21. It should be noted that the conduction of transistor 16 is thus prematurely terminated and that transistor 16 conducts only for a period of time sufficient to provide a gating pulse for the controlled rectifier 14 which as soon as it (i.e., controlled rectifier 14) begins to conduct biases transistor 16 out of conduction. It should be additionally noted that the "firing" circuit functions for only a relatively short period of time and is quickly conditioned for the next half cycle.

Inductor 29 supplies current to the load 34 through diode 20 during the periods silicon controlled rectifier 14 is not conducting and thus keeps the load voltage at a substantially constant value. By way of reiteration, it should be obvious to the reader at this point that high speed, hence efficient and precise, switching regulation is obtained by the present invention. This is due mainly to the fact that the conduction interval of the controlled rectifier is quickly initiated with the firing circuit rapidly conditioned for the next half cycle of input potential while the conduction interval is equally as quickly terminated at the end of each half cycle of input potential by the combination of the filter inductor and flyback diode 20. In keeping with this high switching speed capability of the invention, inductor 29 in combination with diode 20 and the source provides forward bias for controlled rectifier 14 so that it may be "fired" quickly.

Resistors 24, 26, and 28, diode 25 and transistor 27 provide a conventional overcurrent protection network. When the load current flowing through resistor 24 (which has only a small resistive value) reaches a value greater than the potential drop of diodes 25, transistor 27 is biased into conduction. Current now flows from the output of diodes 6 and 7, through control rectifier 14, and divides into the parallel path, one branch of which comprises the load 34 while the other branch comprises diode 25, resistors 26, 28, and 31, and the emitter-collector path of transistor 27. Current flow through the collector-emitter path of transistor 27 and resistor 31 is such that Zener diode 30 no longer conducts, and transistor 23 is biased close to cut-off which, in turn, "opens" the charge path of capacitor 36. Since capacitor 36 no longer has a charge path, there is no longer any means for biasing controlled rectifier 14 into conduction and the circuit is effectively "shut down" thus providing the desired overcurrent protection.

Resistors 12 and 13 are biasing resistors. Capacitor 11 acts as a "tank" to provide energy to "pulse" the winding 17 when the transistor 16 is biased into conduction, as discussed heretofore. Capacitor 9 is also a "tank" to provide energy to insure the continued breakdown of Zener diode 10.

Although the foregoing discussion is directed to a single phase regulator-rectifier for clarity of discussion, it should be understood that the invention may also be practiced in a three-phase configuration by providing similar units in each phase, with the exception that a common error detector and overcurrent protection network may be employed.

Since changes may be made in the above-described arrangement and different embodiments may be devised by those skilled in the art without departing from the spirit and scope of the invention, it is to be understood that all matter contained in the foregoing description and accompanying drawings is illustrative of the application of the principles of the invention and is not to be construed in a limiting sense.

What is claimed is:

1. A regulated rectifier comprising a controlled rectifier having anode, cathode and gate electrodes, a load, a source of pulsating potential, means for serially connecting said source, the anode and cathode electrodes of said controlled rectifier and said load, a capacitor, a transistor having base, emitter and collector electrodes, a source of reference potential, a transformer having at least first and second windings, means responsive to load voltage variations for determining the charging rate of said capacitor, means for connecting the base electrode of said transistor to said load voltage responsive means and to said capacitor, means for serially connecting the emitter electrode of said transistor, said source of reference potential, said capacitor and the base electrode of said transistor, means including said first winding of said transformer for connecting the collector and emitter electrodes of said transistor, means including said second winding of said transformer for connecting the gate and cathode electrodes of said controlled rectifier, and means including an asymmetrically conducting device for serially connecting said capacitor and the anode and cathode electrodes of said controlled rectifier.

2. A regulated-rectifier comprising a controlled rectifier having anode, cathode and gate electrodes, a load, a source of alternating-current potential, first and second transformers, said first transformer having primary and a center tapped secondary winding, said second transformer having first, second and third windings, first, second, third, fourth and fifth asymmetrically conducting devices, first, second, third, fourth, fifth, sixth, seventh, eighth, and ninth resistors, first, second and third Zener asymmetrically conducting devices, a potentiometer, first, second and third transistors each having a base, emitter and collector electrode, an inductor, first, second and third capacitors, means for connecting said source of alternating-current potential to the primary winding of said first transformer, means for serially connecting the secondary winding of said first transformer, said first asymmetrically conducting device and said second asymmetrically conducting device, means for serially connecting the juncture of said first and second asymmetrically conducting devices, the anode and cathode electrodes of said controlled rectifier, said first resistor, said load, said inductor and the center tapped secondary winding of said first transformer, means for serially connecting the anode electrode of said controlled rectifier, said second resistor, said first Zener asymmetrically conducting device, said third resistor, said fourth resistor and the center tapped secondary winding of said first transformer, means for connecting said first capacitor across said third resistor, means for serially connecting said second capacitor across said third resistor and said first Zener asymmetrically conducting device, means for serially connecting said second Zener asymmetrically conductive device across said second resistor and the anode and cathode electrodes of said controlled rectifier, means for serially connecting the emitter electrode of said first transistor, said first Zener asymmetrically conducting device, said third capacitor, said first winding of said second transformer and said base electrode of said first transistor, means for serially connecting the emitter electrode of said first transistor, said third resistor, said second winding of said second transformer and the collector electrode of said first transistor, means for connecting said third winding of said second transformer to the cathode and gate electrodes of said controlled rectifier, means for connecting said third asymmetrically conducting device from the center tapped second winding of said first transformer to the cathode electrode of said controlled rectifier, means for serially connecting the cathode electrode of said controlled rectifier, said fourth asymmetrically conducting device, said fifth resistor, the collector-emitter electrodes of said second transistor and said sixth resistor, means for connecting said third capacitor to said third asymmetrically conducting device, means for serially connecting said fifth asymmetrically conducting device, said seventh resistor, the emitter-base electrodes of said third transistor and said first resistor, means including said eighth resistor for connecting the collector electrode of said third transistor to the emitter electrode of said second transistor, means for serially connecting said third Zener asymmetrically conducting device and said sixth resistor across said load, means connecting said potentiometer and said ninth resistor across said load, and means for connecting the base electrode of said second transistor to the juncture of said potentiometer and said ninth resistor.

3. A regulator circuit which comprises a source of alternating current, a load, at least one semiconductor controlled rectifier with respective states of high and low conductivity having its anode-cathode path connected between said source and said load, a timing impedance and a variable resistance device connected in series with each other, means to supply current from said source through said timing impedance and said variable resistance device at the beginning of at least every alternate half cycle of the alternating current from said source, means to detect departures of the voltage across said load from a predetermined level, means to adjust the resistance of said variable resistance device under the control of detected departures of the voltage across said load from said predetermined level, and means to generate a pulse of predetermined amplitude to gate said controlled rectifier to its state of high conductivity during at least every alternate half cycle of the alternating current generated by said source as soon as the voltage across said timing impedance reaches a predetermined magnitude.

4. A regulator circuit which comprises a source of alternating current, a load, at least one semiconductor controlled rectifier with respective states of high and low conductivity having its anode-cathode path connected between said source and said load, a timing capacitor and a variable resistance device connected in series with each other, means to commence charging said timing capacitor from said source through said variable resistance device at the beginning of at least every alternate half cycle of the alternating current from said source, means to detect departures of the voltage across said load from a predetermined level, means to adjust the resistance of said variable resistance device under the control of detected departures of the voltage across said load from said predetermined level, and means to generate a pulse of predetermined amplitude to gate said controlled rectifier from its state of low conductivity into its state of high conductivity during at least every alternate half cycle of the alternating current generated by said source in response to a predetermined voltage across said timing capacitor.

5. A power supply comprising a semiconductor controlled rectifier having cathode, anode, and gate electrodes, a source of alternating current, a load, means serially connecting said source of alternating current, the anode-cathode path of said controlled rectifier, and said load to pass the sinusoidal signal of said alternating current source to said load when the anode-cathode path of said controlled rectifier is conductive, an error detector connected to said load to detect variations of the load voltage from a reference voltage, a capacitor, a blocking oscillator, means connecting said blocking oscillator to said capacitor and said controlled rectifier, said blocking oscillator being responsive to a predetermined potential across said capacitor to apply a gating pulse of predetermined amplitude to the gate-cathode path of said controlled rectifier, and means serially connecting said alternating current source, said capacitor, and said error detector to change the charge on said capacitor to said predetermined potential under the control of load voltage variations during at least the alternate half sinusoids of said source, whereby said controlled rectifier is switched at a relatively high frequency.

6. A regulator circuit in accordance with claim 5 comprising a diode poled in the forward conductivity direction to connect the anode-cathode path of said controlled rectifier to said capacitor and said blocking oscillator so that said capacitor is discharged and said blocking oscillator is prematurely returned to the nonconductive state before the completion of its normal regenerative conduction interval by conduction through the anode-cathode path of said controlled rectifier.

References Cited by the Examiner
UNITED STATES PATENTS

| | | | |
|---|---|---|---|
| 2,698,416 | 12/1954 | Sherr | 323—22 |
| 2,994,029 | 7/1961 | Bixby | 323—9 |
| 3,099,754 | 7/1963 | Jones et al. | 307—88.5 |
| 3,114,097 | 12/1963 | Clarke | 321—18 |
| 3,116,446 | 12/1963 | Healey | 321—18 |
| 3,152,296 | 10/1964 | Meszaros | 321—18 |
| 3,191,112 | 6/1965 | Cain | 318—246 |

OTHER REFERENCES

"Electronics," article by A. A. Sorenson, Nov. 25, 1960, pp. 121–123.

LLOYD McCOLLUM, *Primary Examiner.*

A. J. GAJARSA, W. E. RAY, *Assistant Examiners.*